Dec. 31, 1940.     A. HARRISON     2,226,768
METHOD OF MAKING HOSE AND THE LIKE
Filed Aug. 6, 1938     2 Sheets-Sheet 1
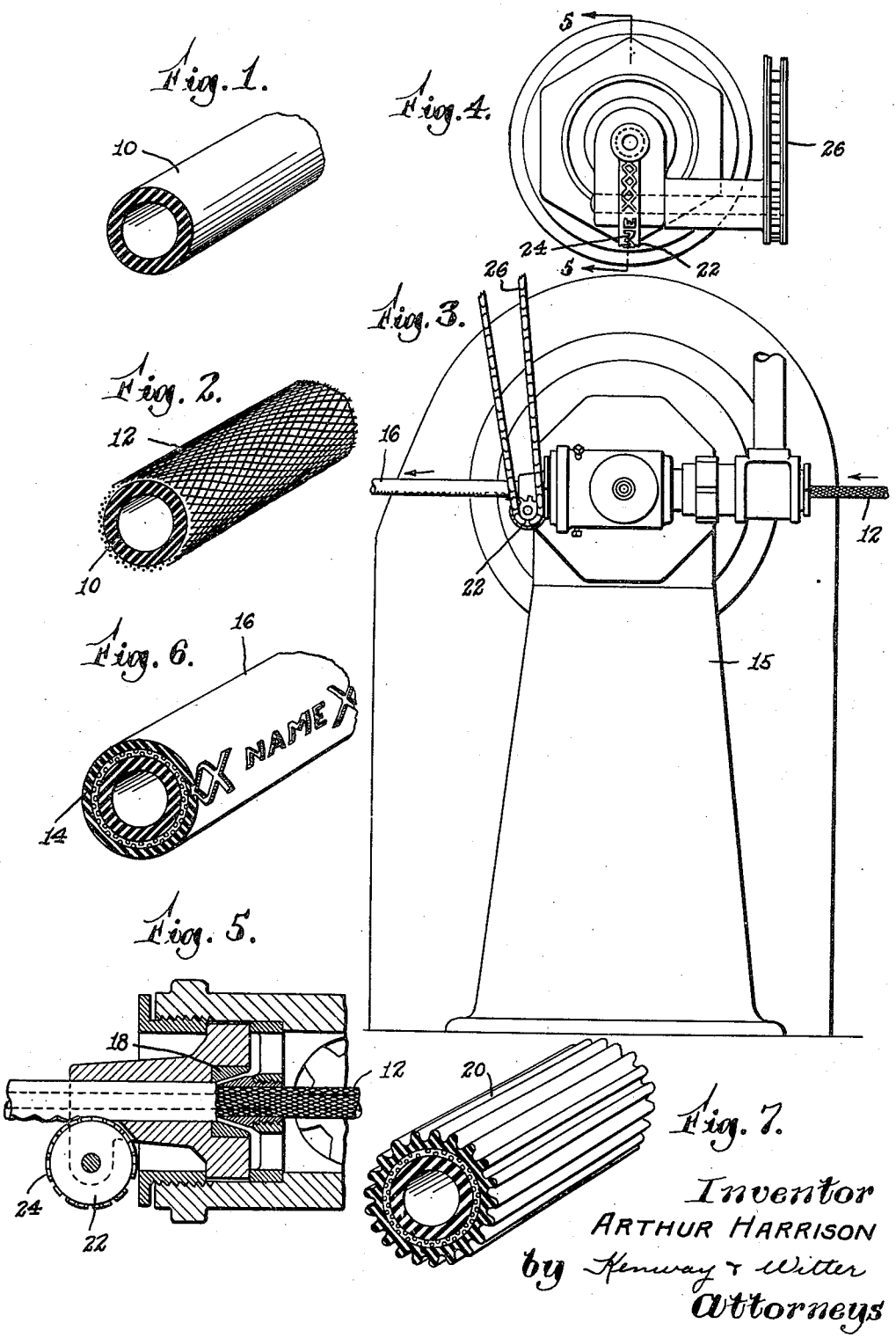
Inventor
ARTHUR HARRISON
by Kenway & Witter
Attorneys Dec. 31, 1940. A. HARRISON 2,226,768
METHOD OF MAKING HOSE AND THE LIKE
Filed Aug. 6, 1938 2 Sheets-Sheet 2
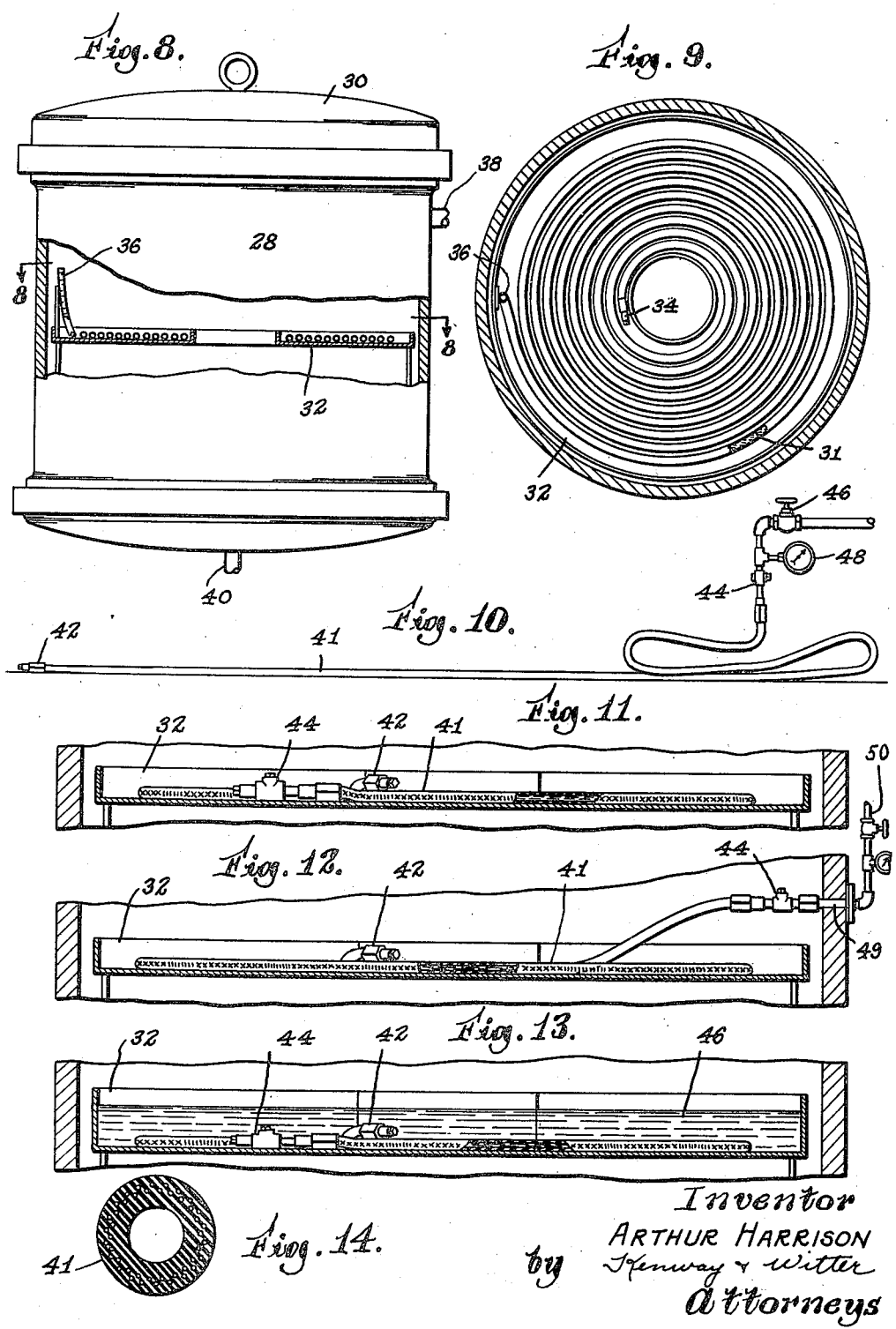
Inventor
ARTHUR HARRISON
by Kenway & Witter
Attorneys Patented Dec. 31, 1940

2,226,768

UNITED STATES PATENT OFFICE 2,226,768

METHOD OF MAKING HOSE AND THE LIKE

Arthur Harrison, Arlington Heights, Mass., assignor to Boston Woven Hose & Rubber Company, Cambridge, Mass., a corporation of Massachusetts Application August 6, 1938, Serial No. 223,486

4 Claims. (Cl. 18—53)

This invention relates to the manufacture of hose and the like, and the primary object of the invention is to devise a novel and simplified method or process for producing hose, reinforced tubing and like products with great economy of labor, materials, and other factory costs, including the elimination of losses now occasioned by defective merchandise. My novel process is adaptable to the making of hose, tubing and the like in the color, size and designs produced by present manufacturing methods.

Hose and reinforced tubing are at present manufactured by many well known methods and the steps generally include (1) building up the hose body, (2) applying a cover thereto usually consisting of a comparatively heavy layer of compounded rubber, and then (3) completing the hose by vulcanizing. This vulcanizing step has heretofore been most commonly carried out by passing the covered hose through an extruding machine known as a lead press and wherein a relatively heavy lead tubing is formed in close outside contact with the hose to serve as a mold therefor during the process of vulcanizing. The lead jacketed hose is placed in a vulcanizer where steam under pressure serves to heat the lead jacket and vulcanize the hose, the hose being held outwardly against the jacket by internal pressure secured by connecting the hose to a source of water under pressure. Another process of hose construction, called the "wrapped method," consists in building up the hose over a pole or mandrel of suitable length, the hose being vulcanized in a steam chamber while it is still supported on the pole.

The above known methods and other special methods employing spiral molds, continuously traveling segmental molds, etc. are extremely expensive and have serious disadvantages. The expense resides largely in costly equipment and the high cost of maintaining and operating the equipment. These methods also have serious limitations which render the manufacture of small runs of hose and quick changes in size and design almost prohibitive. Furthermore, these methods do not permit the imparting of special designs or marks to the exterior of the hose, the lead jacketing method being limited to a longitudinal corrugating of the hose and the "wrapped method" being even further limited in this respect. A further object of my invention is to make available a novel method of manufacture largely eliminating these disadvantages and limitations and permitting preferred designs and markings to be molded in the exterior of the hose.

In accordance with my novel method, the hose body is built up in any preferred manner to a condition where it is ready to receive its rubber cover. I preferably perform this covering operation by passing the hose through a tubing machine wherein a rubber covering is applied and either left smooth or marked with selected designs or markings, although the cover can be applied by other known methods, as by wrapping thin calendered rubber sheets around the hose. Whatever method is employed, the hose is ready for vulcanizing as soon as its rubber cover is in place thereon. In accordance with my invention this vulcanizing step is effected most economically and requires only simple and inexpensive equipment, provision being made for giving both internal and external pressure to the hose during its vulcanization and for performing the vulcanizing step by direct contact of the vulcanizing medium with the exterior of the hose. The hose is thereby completed with the selected design and markings thereon and is then ready for sale and use.

These and other features of the invention will be best understood and appreciated from the following description of several different modes of carrying the novel process into effect, selected for purposes of illustration and shown in the accompanying drawings in which Fig. 1 is a fragmentary perspective view of rubber tubing for the interior of the hose.

Fig. 2 illustrates the tubing reinforced with textile fabric.

Fig. 3 is a side elevation of a tubing machine for placing a tubular rubber covering over the reinforced tubing.

Fig. 4 is a fragmentary front elevation of the machine.

Fig. 5 is an enlarged sectional view taken on line 5—5 of Fig. 4.

Fig. 6 is a fragmentary perspective view of the covered tubing after passing through the tubing machine.

Fig. 7 is a like view showing the exterior of the cover as corrugated.

Fig. 8 is a side elevation, partially broken away, of a steam chamber for vulcanizing the hose.

Fig. 9 is a sectional view taken on line 9—9 of Fig. 8.

Fig. 10 illustrates the step of filling the hose with water under a predetermined pressure.

Fig. 11 is an enlarged fragmentary view showing the water-filled hose under a predetermined pressure and in position to be steam vulcanized in the chamber.

Fig. 12 is a like view showing the hose connected to a source of variable pressure.

Fig. 13 is a view like Fig. 11 but showing the hose submerged in water in the chamber.

Fig. 14 is a cross sectional view through the completed hose.

Referring now more specifically to the drawings by reference characters, 10 indicates an extruded rubber tube which is adapted to form the interior of the hose. After this tube has been formed it is usually reinforced by wire or textile fabric and as illustrated in Fig. 2 it may be reinforced by a sheath or wrapping of textile material 12 of which there may be one or a plurality of plies. The combined tube and reinforcing may be termed the body of the hose. Most hose constructions employ a cover over this body whereby to protect the hose from abrasion, moisture and other harmful effects and this cover most commonly comprises a comparatively heavy layer of compounded rubber.

In accordance with my invention, I preferably apply the rubber coating 14 by passing the hose body 10—12 through a tubing machine 15 whereby the outside 16 of the hose cover may be left smooth or may have suitable designs imparted thereto and including selected patterns and markings. This machine employs a die 18 through which the hose is moved together with the tubular rubber coating extruded and formed therearound. The die may have a smooth wall whereby to form the smooth outer surface 16 illustrated in Fig. 6 or the wall may be of a shape to form the corrugations illustrated at 20 in Fig. 7.

It is also frequently desired to apply special patterns and markings, such as a trade-mark or name, to the hose and in accordance with my invention the hose can be thus marked as it passes through the die. This marking is effected through the use of one or more marking wheels 22 rotatably mounted in the die and having on the circumference thereof dies 24 of the pattern or markings to be impressed into the cover. As the hose moves forwardly these wheels roll over the plastic cover and impress the pattern thereinto. The pattern and markings can be changed as desired merely by removing the wheels and substituting others having dies of the desired pattern. The marking wheels 22 may be mounted for free rotation or they may be driven through a chain 26 from the extruding machine at a surface speed corresponding to the extruding speed of the cover being formed.

When the hose is covered, by the tubing machine as above described or otherwise, it is ready to be vulcanized. In accordance with my invention this vulcanizing step may be satisfactorily effected within a steam chamber 28 having a cover 30. The vulcanizing conditions may be considerably varied to care for the requirements of different types and sizes of hose. As illustrated in Figs. 8 and 9, the hose is being vulcanized by the direct action of steam in the steam chamber with balanced internal and external pressures on the hose. The hose is first completely filled with water, as indicated at 31, and is then coiled into the pan 32, the inner end of the hose being closed by a plug 34 and the outer end 36 being maintained in elevated position and open, or both ends may be open and in position sufficiently elevated to maintain a pressure head of at least several inches on the water in the hose. It will be understood that several such coils are simultaneously vulcanized in a series of pans stacked in the chamber. With the pans and hose in place, steam under suitable pressure is admitted to the chamber at 38. This steam vulcanizes the hose by the heat of its direct contact therewith and acts on the water at the open end of the hose to effect a substantially balanced internal and external pressure. A suitable drain trap for the steam chamber is provided at 40. Thus the material forming the walls of the hose are subjected inside and outside to the full pressure of the steam, there being no pressure tending to expand or contract the hose as a whole.

In some cases and with certain types of hose, it may be desirable to provide a greater internal pressure in the hose during vulcanization. In such case the hose 41 is first filled with water under the desired pressure, as in the manner illustrated in Fig. 10. Suitable valves 42 and 44 are temporarily provided at the ends of the hose and the hose is connected to a water tap 46, a pressure gauge 48 being provided in the connection. As the hose is being filled, the valve 42 is opened sufficiently to permit escape of air in the hose and when the desired water pressure is reached both valves 42 and 44 are closed. The hose is then placed within the chamber and vulcanized. It will be apparent that the pressure in the hose will somewhat increase, due to heat, during the vulcanizing operation.

In accordance with my invention, the vulcanizing of the hose is effected by direct action thereon of the surrounding vulcanizing fluid in the chamber and, while this fluid will ordinarily be the steam in the chamber, it may also be a liquid such as water heated directly by the steam. In Fig. 11 the hose 41 is illustrated as placed in the vulcanizing pan in position to be subjected to the direct action of the steam while in Fig. 13 the hose is illustrated as covered with water 46. The water vulcanization is preferred is some cases particularly for the purpose of preventing blisters in the cover. It is apparent that if desired, other suitable liquids such as glycerine may be used in lieu of the water both within and outside of the hose, and I desire it to be understood that by reference to water throughout the specification and claims herein it is intended to include water or other equivalent liquids.

As illustrated in Fig. 12, it may be desirable in some cases to connect the hose with a source of pressure outside of the vulcanizing chamber and which pressure will ordinarily be held constant during the vulcanizing operation. In this case a pipe 49 is extended through the wall of the vulcanizing chamber. One end of the hose to be vulcanized is connected with the inner end of this pipe and the outer end of the pipe is connected to a source of pressure 50 outside of the vulcanizing chamber.

It will now be apparent that I have disclosed a novel method of making and vulcanizing hose which has many advantages over methods heretofore employed. The greatest advantage appears to reside in the simplicity of the process and the elimination of the expensive equipment and operations heretofore required. Also of great importance is the adaptability of the process to the producing of short runs of hose and providing various patterns and markings on the cover, my novel method permitting the imparting of cover designs, printing, etc. impossible in processes heretofore known.

Having thus described my invention what I claim as new and desire to secure by Letters Patent of the United States is:

1. A process of making hose, which consists in forming a hose body, applying a rubber cover to the body, completely filling the resulting hose with water, closing the ends of the hose with the water therein maintained under a predetermined pressure, and vulcanizing the water-filled hose with its walls under internal and external pressure in a pressure chamber containing fluid heated to vulcanizing temperature and with the outer surface of the hose exposed to such fluid in the chamber.

2. The process defined in claim 1 in which the water in the hose is at a pressure higher than the pressure of said fluid in the chamber during the vulcanizing operation.

3. The process defined in claim 1 in which one end of the hose is kept in communication with a source of pressure outside of the chamber during the vulcanizing operation.

4. A process of making hose of the type having an extruded rubber cover with a design impressed therein, which consists in completely filling the unvulcanized hose with liquid, maintaining a substantial and predetermined pressure on the enclosed liquid, and vulcanizing the liquid-filled hose while its walls are maintained under internal and external pressure in a pressure chamber containing fluid heated to vulcanizing temperature and with the outer surface of the hose exposed to such fluid in the chamber.

ARTHUR HARRISON.